(12) United States Patent
Cowie et al.

(10) Patent No.: US 7,963,339 B2
(45) Date of Patent: Jun. 21, 2011

(54) BEARING MOUNTED BALL VALVE AND METHOD OF USE

(75) Inventors: Gavin David Cowie, Kincardineshire (GB); Jeffrey Charles Edwards, Aberdeen (GB)

(73) Assignee: Enovate Systems Limited, Aberdeen (GB)

( * ) Notice: Subject to any disclaimer, the term of this patent is extended or adjusted under 35 U.S.C. 154(b) by 539 days.

(21) Appl. No.: 11/665,087

(22) PCT Filed: Oct. 17, 2005

(86) PCT No.: PCT/GB2005/004001
§ 371 (c)(1),
(2), (4) Date: Oct. 29, 2008

(87) PCT Pub. No.: WO2006/040592
PCT Pub. Date: Apr. 20, 2006

(65) Prior Publication Data
US 2009/0050332 A1    Feb. 26, 2009

(30) Foreign Application Priority Data
Oct. 16, 2004   (GB) .................................. 0423015.7

(51) Int. Cl.
*E21B 34/10*   (2006.01)
(52) U.S. Cl. .................. 166/373; 166/332.3; 166/334.2; 251/315.07
(58) Field of Classification Search ............... 166/332.3, 166/334.2, 386, 373–375; 251/315.07
See application file for complete search history.

(56) References Cited

U.S. PATENT DOCUMENTS

| 1,908,762 | A | * | 5/1933 | Johnston et al. ................ 137/45 |
| 3,036,590 | A | | 5/1962 | Knox |
| 4,210,207 | A | | 7/1980 | McStravick et al. |
| 4,911,409 | A | | 3/1990 | Oliver et al. |
| 6,708,946 | B1 | | 3/2004 | Edwards et al. |
| 7,350,765 | B2 | * | 4/2008 | Leblanc et al. .......... 251/315.01 |

FOREIGN PATENT DOCUMENTS

| EP | 0 278 675 A2 | | 8/1988 |
| GB | 1 390 049 | | 4/1975 |
| WO | WO 00/15943 | * | 3/2000 |

* cited by examiner

Primary Examiner — David J. Bagnell
Assistant Examiner — David Andrews
(74) Attorney, Agent, or Firm — Tarolli, Sundheim, Covell & Tummino LLP

(57) ABSTRACT

A bearing mounted ball valve (10) comprises a housing (12) having a throughbore and a valve seat (16) and an apertured ball (18) mounted within the housing in continuous engagement with the valve seat. The apertured ball is rotatable by rotation means (20), about an axis of rotation, between a throughbore open position and a throughbore closed position. The bearing mounted ball valve further comprises bearing means (26) coupled between the apertured ball and the housing for constraining the rotation of the apertured ball about the axis of rotation between the throughbore open and the throughbore closed position. In the throughbore closed position, the bearing means is adapted to release the apertured ball from the axis of rotation to permit the apertured ball to float into a sealing engagement with the valve seat.

17 Claims, 6 Drawing Sheets

BEARING MOUNTED BALL VALVE AND METHOD OF USE

FIELD OF THE INVENTION

The present invention relates to ball valves and particularly to bearing mounted ball valves.

BACKGROUND OF THE INVENTION

Apertured ball valves are well known for controlling the flow of a fluid through a bore, particularly in the oil and chemical process industries.

In an apertured ball valve, the valve operation may be broken down into two separate stages; firstly, the ball moves between an open and a closed position by rotating through 90° such that the ball aperture moves from an orientation coaxial with the flow direction, i.e. when the valve is open, to a position whereby the ball aperture is perpendicular to the flow direction. Secondly, the valve seals in the closed position to prevent flow through the bore across the ball valve.

A common type of conventional ball valve is the trunnion mounted ball valve in which the ball element is positionally constrained inside the valve, usually by radial bearings. The ball is rotated by the application of torque to the trunnion. Sealing occurs as a result of the valve seat floating onto the ball element. A disadvantage of this type of ball valve is that seal reliability is reduced because the sealing force only develops in proportion to the annular area of the valve seat. Thus, when trunnion mounted ball valves are used in high pressure wells and especially in "aggressive" wells in which the well fluid has a high proportion of particulate matter, the pressure is such that the particulate matter may cause degradation of the sealing surfaces of the ball and the valve seat, resulting in the valve not achieving adequate sealing integrity.

Another type of conventional ball valve is known as the floating ball valve. In this type of valve the ball is not positionally constrained relative to the valve body. Rotation is caused by the application of force to a point that is offset from the ball centre, which, in conjunction with the mating curvatures of the ball and seat, causes the ball to rotate. Sealing occurs as a result of the ball floating onto the valve seat. The disadvantage of the floating ball valve is the rotational reliability is reduced as the friction effects between the ball and seat are considerably larger than that of trunnion mounted devices. With aggressive wells, the reliability of the floating ball valve creates a problem in that the valve often seizes between the open and the closed position giving rise to serious problems in both operational and safety terms.

SUMMARY OF THE INVENTION

It is an object of the present invention to obviate or mitigate at least one of the aforementioned disadvantages.

According to a first aspect of the present invention there is provided a bearing mounted ball valve comprising:

a housing having a throughbore and a valve seat;

an apertured ball mounted within the housing in continuous engagement with the valve seat, the apertured ball being rotatable by rotation means, about an axis of rotation, between a throughbore open position and a throughbore closed position, and bearing means coupled between the apertured ball and the housing for constraining the rotation of the apertured ball about the axis of rotation between the throughbore open and the throughbore closed position, wherein in the throughbore closed position, the bearing means is adapted to release the apertured ball from the axis of rotation to permit the apertured ball to float into a sealing engagement with the valve seat.

Thus, the bearing mounted ball valve of the present invention combines highly reliable rotation of the apertured ball between the throughbore open and throughbore closed positions with increased reliability of sealing due to the apertured ball being permitted to float onto the valve seat. As the apertured ball remains continuously in contact with the valve seat, the ingress of debris or particulate matter is reduced.

Preferably, the bearing means comprises a pair of bearing plates located on diametrically opposite sides of the throughbore, each plate having a plurality of hemispherical pockets, each pocket containing a ball bearing. A pair of bearing plates is optimal for constraining the rotation of the apertured ball on the axis of rotation from the throughbore open to the throughbore closed position.

Preferably, the apertured ball has an outer surface defining a pair of channels, each channel opposing one of the bearing plates. Each ball bearing engages the channel opposing the bearing plate within which they are located. The channels may have a substantially semi-circular cross-section, the width of each channel being substantially the same as the diameter of the/each ball bearing.

In an alternative arrangement, each of the pair of bearing plates defines a channel, and the ball bearings are located in hemispherical pockets defined by the portions of the outer surface of the apertured ball which oppose the bearing plates.

Preferably, the channels are arcuate channels, the arc being centred on the axis of rotation of the apertured ball.

Preferably, at least one portion of each channel is dimensioned to permit the apertured ball to move in an axial direction towards the valve seat when the apertured ball is in the throughbore closed position. The at least one portion of each channel may be dimensioned by providing an increased width. An increased width permits the apertured ball to float into a sealing engagement with the valve seat.

The axial movement of the apertured ball may be approximately 0.6 mm (0.025"). A movement of the apertured ball of approximately 0.6 mm applies a sufficient load to the valve seat to form a high integrity seal.

Preferably, each bearing plate comprises three hemispherical pockets and three ball bearings. The use of three ball bearings on each plate provide adequate reliability of rotation of the apertured ball at an acceptable level of friction.

Where the bearing plate comprises three ball bearings, one of the ball bearings is located on a plane which passes through the axis of rotation of the apertured ball, the plane additionally being perpendicular to the longitudinal axis of the throughbore. Positioning one of the three ball bearings as described means that when the apertured ball reaches the closed position, the channel immediately below this ball bearing is sufficiently axial for the apertured ball to move towards the valve seat without need for the width of the channel at this location to be increased. Therefore in the case of three ball bearings, only two channel portions of increased width are required.

The housing may further include at least one support surface distal to the valve seat, the outer surface of the apertured ball having at least one complementary surface for engaging the at least one support surface. There may be two support surfaces on diametrically opposed sides of the housing. Alternatively, the support surfaces are incorporated into the bearing plates. A support surface is provided to withstand the pressure associated with testing the valve when closed, the test pressure being applied from the valve seat side of the valve.

The rotational means may comprise an annular piston located within the housing and adapted to engage the apertured ball.

Preferably, the annular piston engages the apertured ball by means of a pair of arms, the arms being pivotally mounted to the annular piston.

The annular piston may be hydraulically actuated. Alternatively, the annular piston may mechanically or electromechanically actuated. In a further alternative the annular piston can be actuated by any suitable means.

According to a second aspect of the present invention there is provided a method of sealing a wellbore with an apertured ball valve, the method comprising:

disposing a ball valve housing having a throughbore and a valve seat in the wellbore;

rotating an apertured ball constrained to an axis of rotation from a throughbore open position to a throughbore closed position, the apertured ball remaining in continuous contact with the valve seat, permitting the apertured ball to move axially when in throughbore closed position into a sealing engagement with the valve seat in the throughbore closed position.

By virtue of the present invention a bore can be sealed by a bearing mounted ball valve, which combines highly reliable rotation with increased reliability of sealing.

BRIEF DESCRIPTION OF THE DRAWINGS

The present invention will now be described, by way of example, with reference to the accompanying figures in which.

DESCRIPTION OF EXAMPLE EMBODIMENTS

Figure 1:
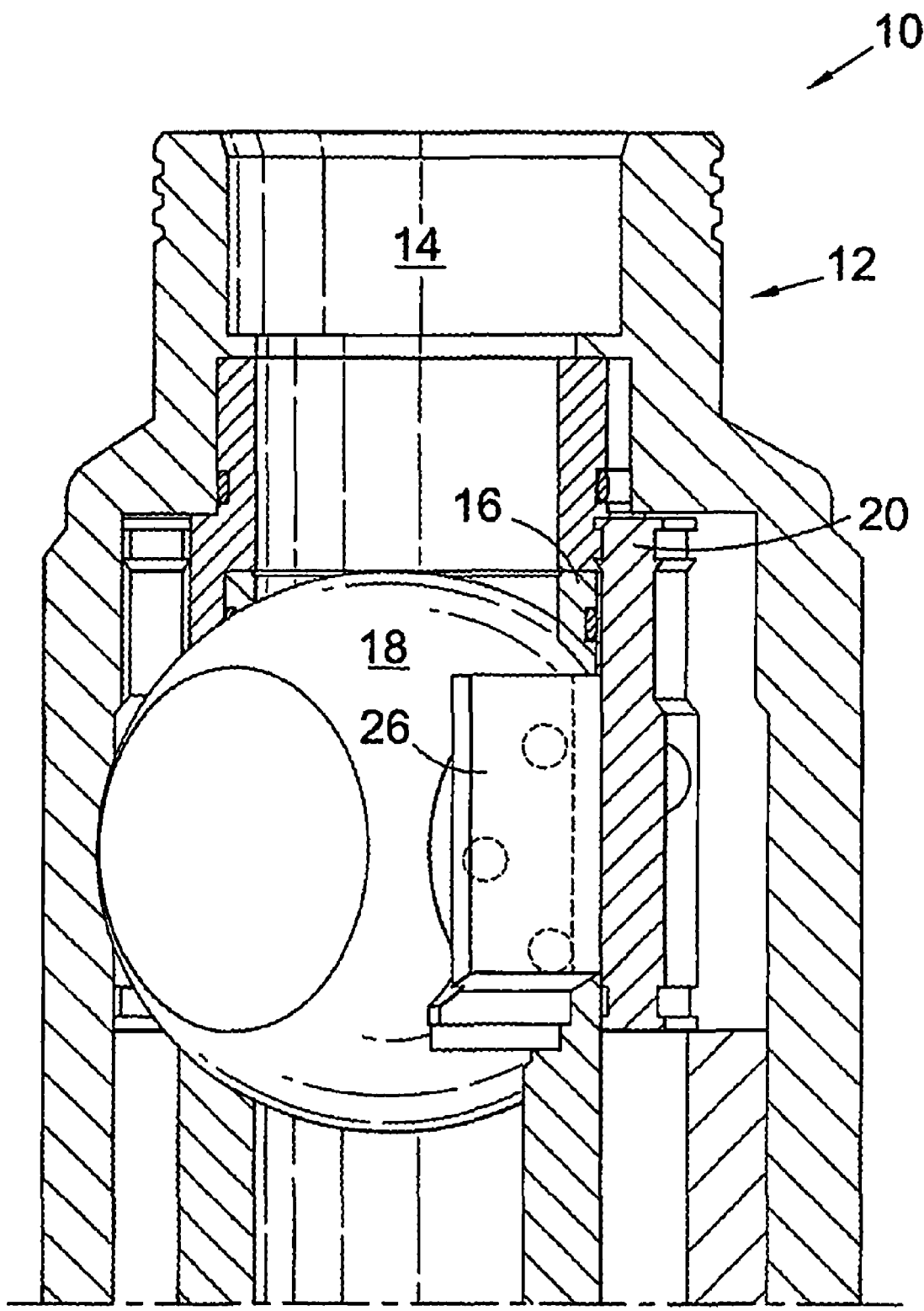
FIG. 1 is a partially cut-away side view of part a bearing mounted ball valve in a closed configuration in accordance with a preferred embodiment of the present invention.

Referring firstly to F*ig*. 1 there is shown a partially cut away side view of part of a bearing mounted ball valve, generally indicated by reference numeral 10 in a closed configuration in accordance with a preferred embodiment of the present invention.

The bearing mounted ball valve 10 includes a housing 12 having a throughbore 14 and a valve seat 16. The throughbore is a longitudinal throughbore with a longitudinal axis 21. An apertured ball 18 is mounted within the housing 12 in continuous engagement with the valve seat 16. The apertured ball 18 is rotatable by rotation means 20 around an axis of rotation 19. The rotation means is discussed in greater detail with reference to FIGS. 2 and 3.

Figure 2:
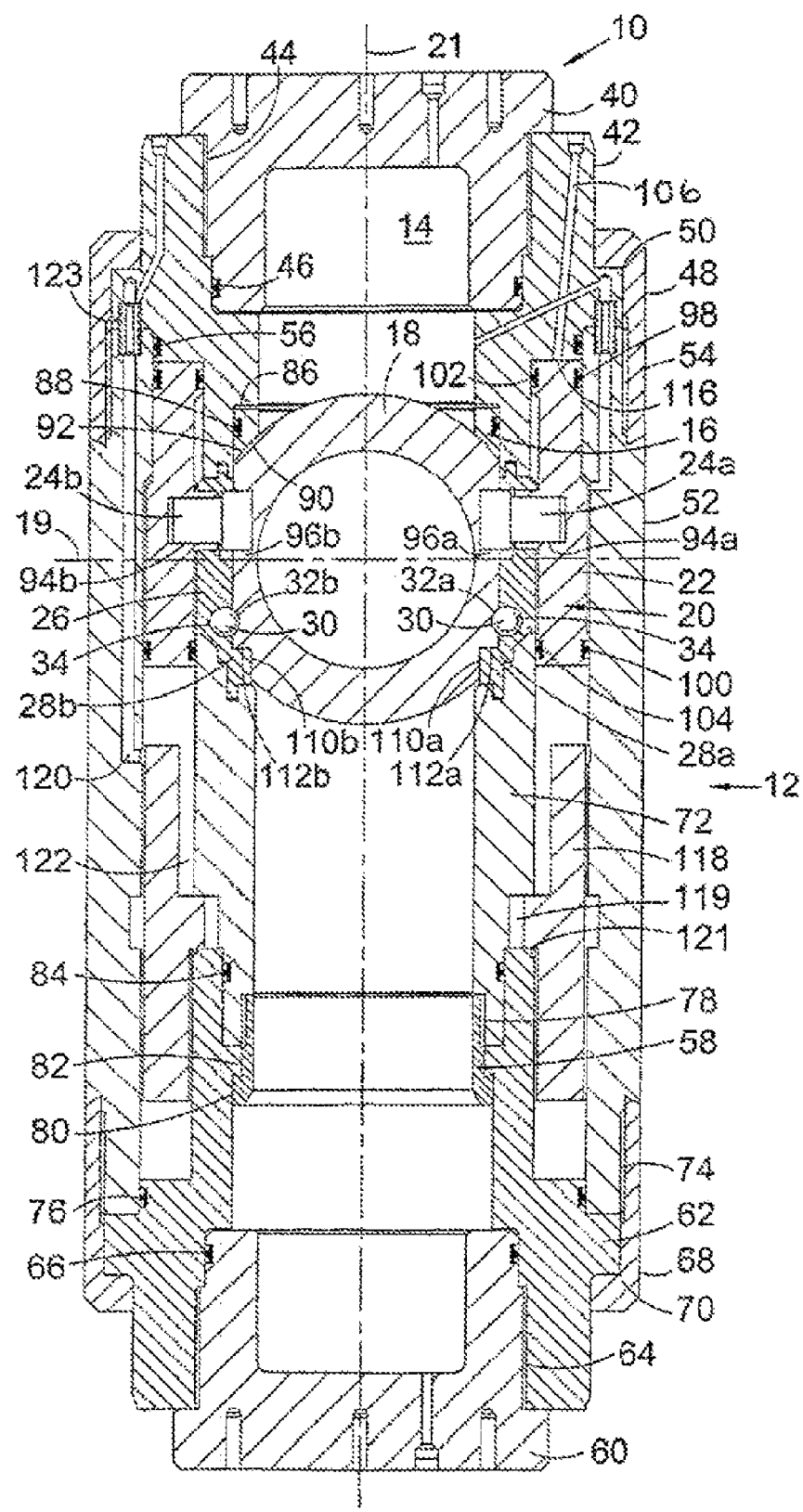
FIG. 2 is a cross sectional side view of the whole bearing mounted ball valve of FIG. 1 in a closed configuration.
Figure 4:
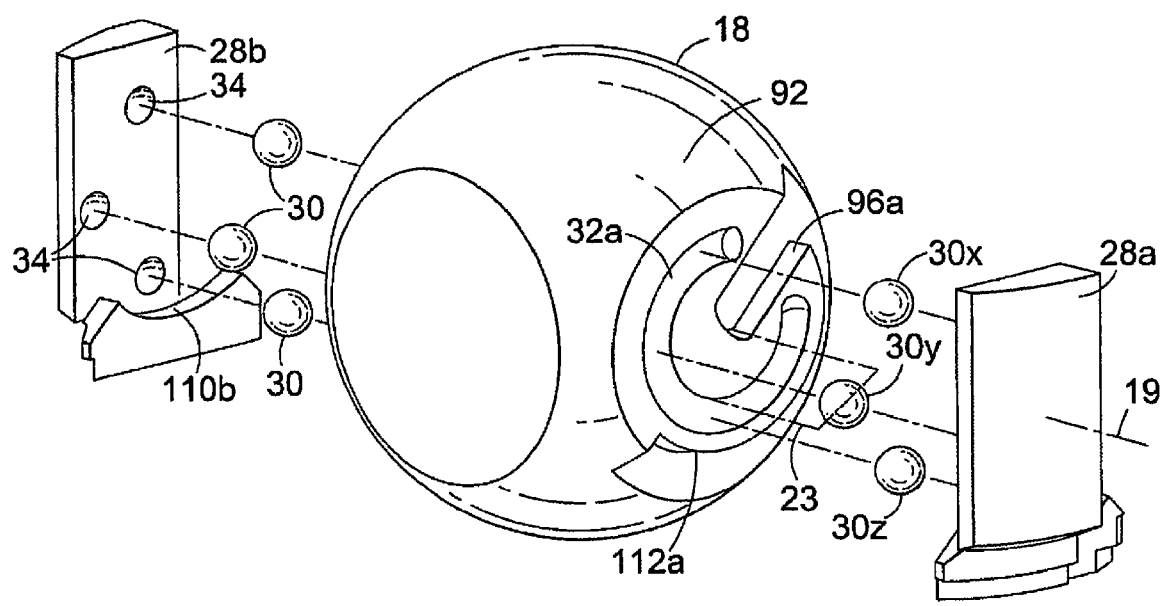
FIG. 4 is an exploded perspective view of the apertured ball and bearing means of the bearing mounted ball valve of FIG. 1.

The ball mounted bearing valve 10 further includes bearing means 26 which is discussed in greater detail with references to FIGS. 2 and 4.

The apertured ball 18 rotates around an axis of rotation 19 between a throughbore open position and a throughbore closed position. When the apertured ball 18 is in the throughbore closed position as shown, the bearing means 26 is arranged to release the apertured ball 18 from the axis of rotation 19 permitting the apertured ball 18 to float into a sealing engagement with the valve seat 16, as will be described later in detail.

Referring now to FIG. 2, there is shown a cross sectional side view of the whole bearing mounted ball valve 10 of FIG. 1 also in the closed configuration. The housing 12 comprises a top cap 40 which is connected to an upper body 42 by means of a threaded connection 44. The top cap 40 and the upper body 42 are sealed by a top cap seal 46. An upper collar 48 provides a shoulder 50 which captures the upper body 42 and fixes it to the main body 52 by means of a threaded connection 54. The upper body 42 is sealed to the main body 52 by means of an upper body seal 56.

At the lower end of the bearing mounted ball valve 10 there is a bottom cap 60 connected to a lower body 62 by means of a threaded connection 64. The bottom cap 60 is sealed to the lower body 62 by means of bottom cap seal 66. A lower collar 68 defines a shoulder 70 which captures the lower body 62 and secures it to the main body 52 by means of a threaded connection 74. A seal is formed between the lower body 62 and the main body 52 by a lower body seal 76.

The lower body 62 is also secured to a mandrel 72 by an inner collar 58. The inner collar 58 is secured to the mandrel by a threaded connection 78 and is secured to the lower body 62 by an annular hook 80 which engages a complimentary annular lug 82 defined by the lower body 62. The mandrel 72 is sealed to the lower body 62 by means of a mandrel seal 84.

The valve seat 16 is disposed in a pocket 86 defined by the upper body 42. A seal is formed between the valve seat 16 and the upper body 42 by a valve seat seal 88. The valve seat 16 has a concave hemispherical face 90 for engaging and forming a seal with a portion of the outer surface 92 of the apertured ball 18.

Figure 3:
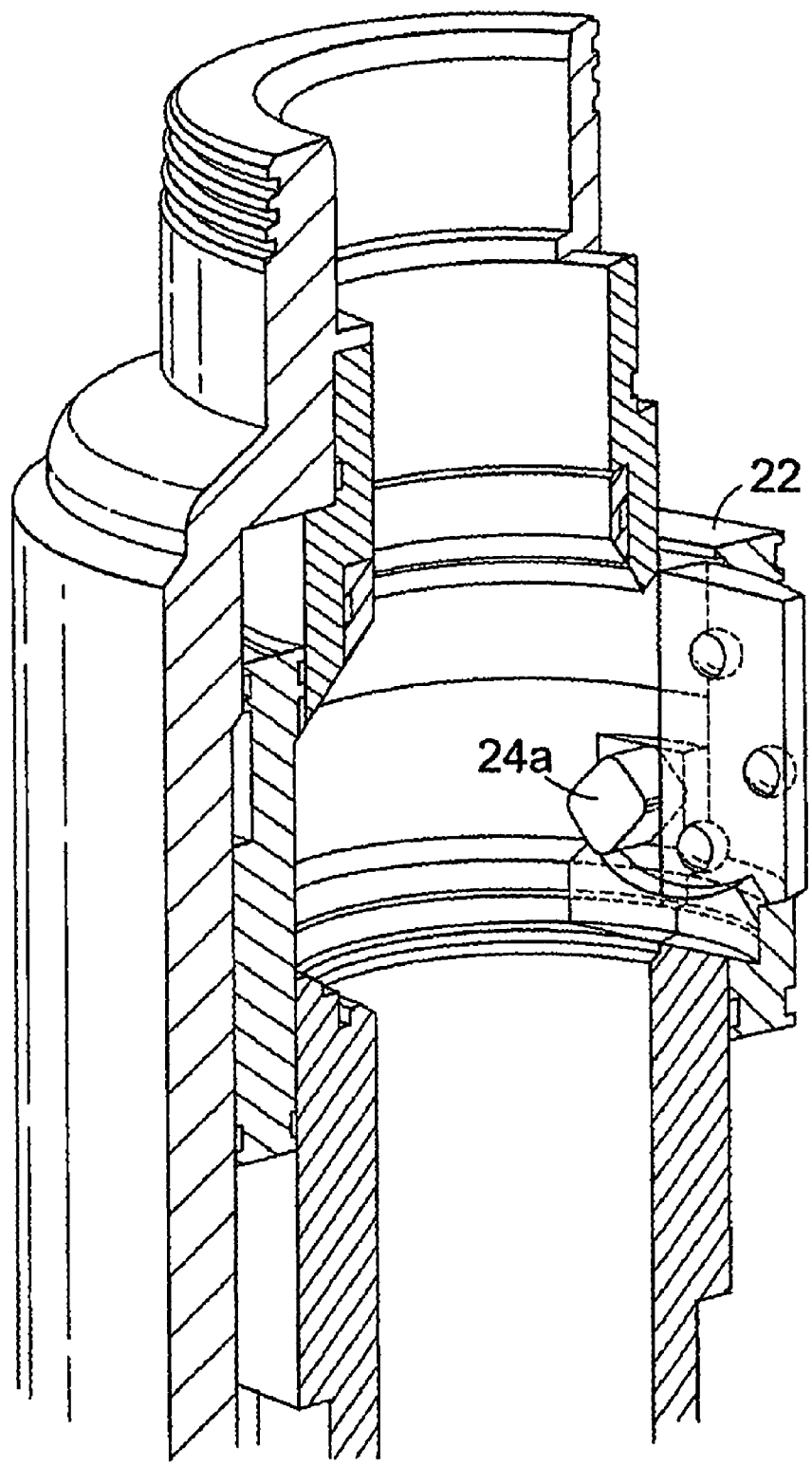
FIG. 3 is a cut-away perspective view of part of the bearing mounted ball valve of FIG. 1 in an open configuration with the apertured ball removed.

The apertured ball 18 is rotatable between the closed throughbore position shown in FIG. 2 and an open throughbore position (best seen in FIG. 5) by rotation means 20, in particular by an annular piston 22. The annular piston 22 is connected to the apertured ball 18 by means of a pair of arms 24a,24b. One end of each arm 24a,24b is pivotally mounted to the annular piston 22 in respective pockets 94a,94b. The other end of each arm 24a,24b engage a respective recess 96a,96b in the outer surface of the apertured ball 18. A perspective view of the arm 24a and the annular piston 22 is shown in FIG. 3, which is a cut away perspective view of part of the bearing mounted ball valve 10 of FIG. 1 with the apertured ball removed.

The upper end of the annular piston 22 is sealed to the main body 52 via the piston upper outer seal 98 and the piston lower outer seal 100. The annular piston 22 is also sealed to the upper body 42 by a piston upper inner seal 102 and to the mandrel 72 by a piston lower inner seal 104.

Captured between the upper body 42, the apertured ball 18, annular piston 22 and the mandrel 72 is the bearing means 26. The bearing means 26 comprises a pair of bearing plates 28a,28b containing three hemispherical pockets 34. Within each hemispherical pocket 34 is disposed a ball bearing 30 so that in the assembled valve shown in FIG. 2, each ball bearing 30 engages one of a pair of channels 32a,32b defined by the outer surface 92 of the apertured ball 18.

This arrangement is best seen in FIG. 4, which is an exploded perspective view of the apertured ball 18 and bearing means 26 of the bearing mounted ball valve 10 of FIGS. 1 and 2. It can be seen from FIG. 4 there are three ball bearings 30 associated with each bearing plate 28a,28b and three mating hemispherical pockets 34 associated with each bearing plate 28. Also shown on FIG. 4 is the channel 32a defined by the outer surface 92 of the apertured ball 18.

The channels 32 have a substantially semicircular cross section and are arcuate in form. The arcuate channels 32a,32b are centred on the axis of rotation 19 of the apertured ball 18.

As will be discussed later two spaced portions 124,126 of the channels 32a,32b are dimensioned to permit the apertured ball 18 to move axially along the longitudinal axis 21 of the bearing mounted ball valve 10 towards the valve seat 16 when the apertured ball 18 is in the throughbore closed position shown in FIG. 5.

Each bearing plate 28 also defines a support surface 110a, 110b for engaging a complimentary surface 112a,112b defined by the outer surface 92 of the apertured ball 18. The support surfaces 110 are provided to withstand the pressure associated with testing the bearing mounted ball valve 10 from above when the valve 10 is closed. Also visible on FIG. 4 is an apertured ball recess 96a which is dimensioned to receive the arm 24a of the rotation means 20.

Figure 5:
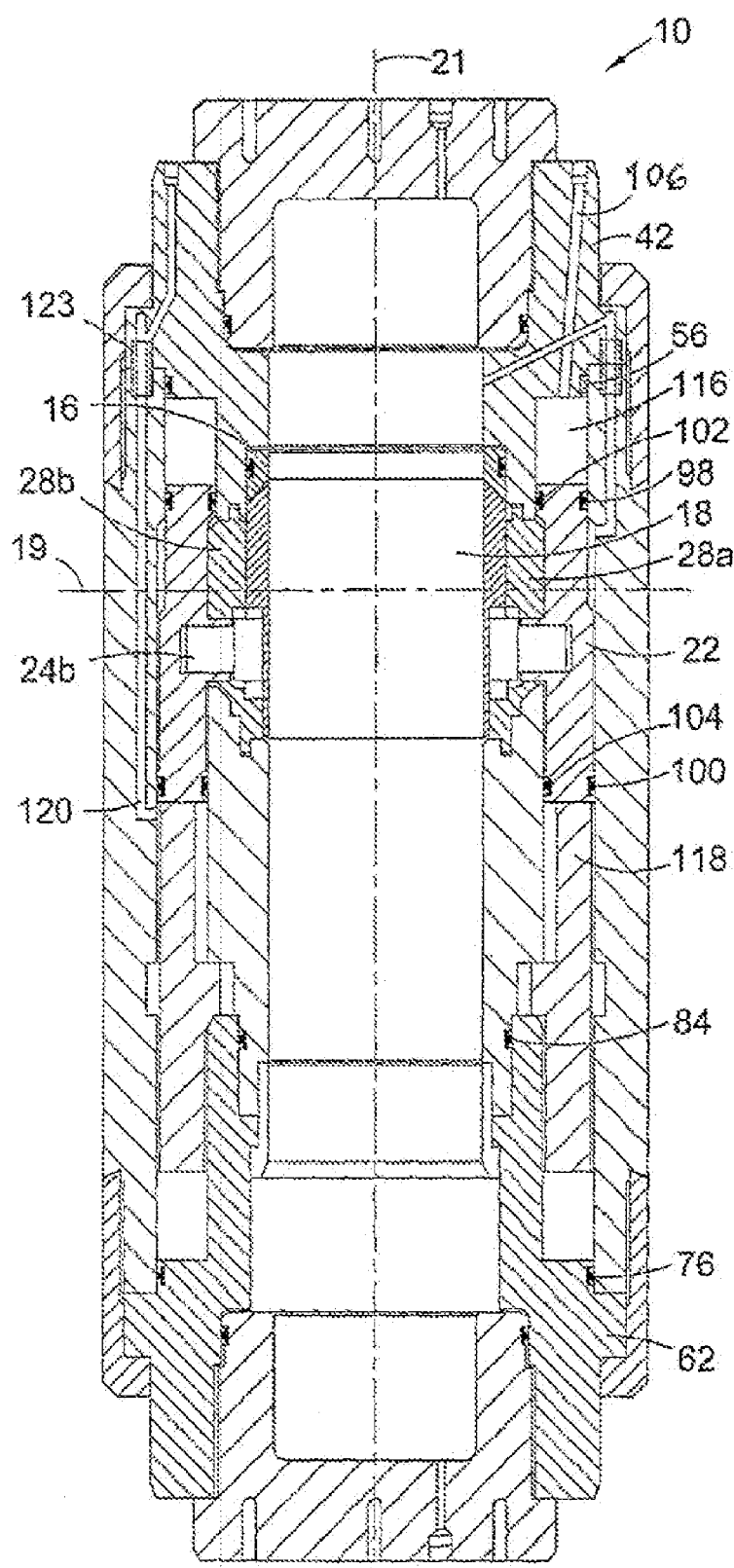
FIG. 5 is a cross sectional side view of the whole bearing mounted ball valve of FIG. 2 in an open configuration.

In operation, to rotate the apertured ball 18 from the throughbore closed position shown in FIG. 2 to the throughbore open position shown in FIG. 5, hydraulic fluid is pumped through an "open" line 106 into an "open" chamber 116. The open chamber 116 is formed by the upper body seal 56, the piston upper outer seal 98 and the piston upper inner seal 102. The hydraulic pressure created within the open chamber 116 forces the annular piston 22 away from the upper body 42 and towards the lower body 62 to the position shown in FIG. 5. This movement is transferred to the apertured ball 18 by the arms 24a, 24b and causes the apertured ball 18 to pivot around the axis of rotation 19 from the throughbore closed position to the throughbore open position.

The apertured ball 18 is constrained to rotate around the axis of rotation 19 by the channels 32a,32b moving relative to the ball bearings 30 which are trapped between the apertured ball 18 and the bearing plates 26 by the hemispherical pockets 34 and the channels 32a,32b.

When the piston 22 has completed its travel towards the lower body 62, the piston 22 abuts a shoulder ring 118.Shoulder ring 118 comprises three 120° segments which are locked together by an inner ring 119. The inner ring 119 is positionally captured in a recess 121 defined by the lower body 62 and the mandrel 72.

To move the apertured ball 18 from the throughbore open position shown in FIG. 5 to the throughbore closed position in FIG. 2, hydraulic fluid would be vented from the open chamber 116 and introduced to a "close" chamber 122 through a "close" line 120. The close line 120 includes a hydraulic stab 123 to permit hydraulic fluid to pass from the upper body 42 to the main body 52.

The close chamber 122 is sealed by the piston lower outer seal 100, the piston lower inner seal 104, the lower body seal 76 and the mandrel seal 84.

Figure 6A:
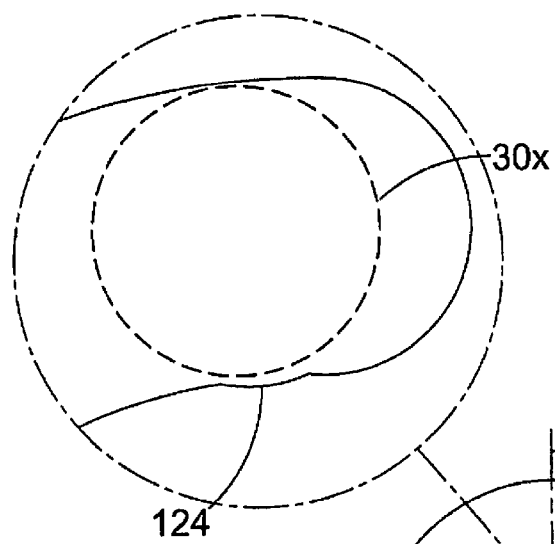
FIG. 6A shows an enlarged view of a first portion of the ball bearing channel of FIG. 6.
Figure 6:
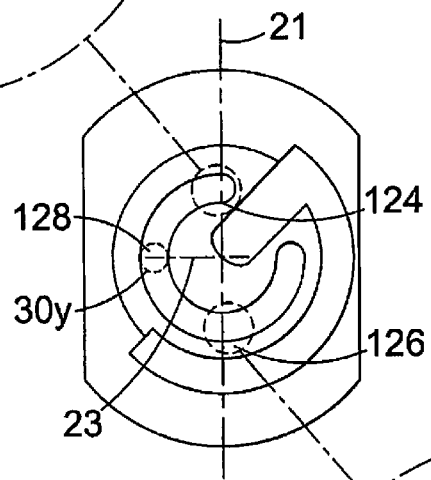
FIG. 6 is a side view of part of the apertured ball of FIG. 5.
Figure 6B:
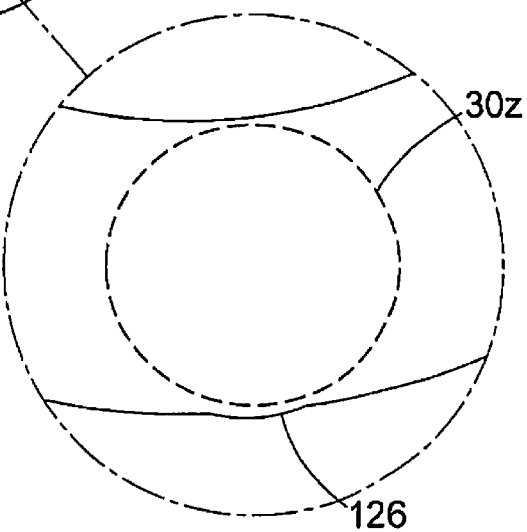
FIG. 6B shows an enlarged view of a second portion of the ball bearing channel of FIG. 6.

When the apertured ball 18 reaches the throughbore closed position (FIG. 2) it is released from the axis of rotation permitting the apertured ball 18 to float into a sealing engagement with the valve seat 16. The release is best explained with reference to FIGS. 6, 6A and 6B. Wider portions 124,126 of the channels 32 are positioned such that they receive two spaced bearings 30x, 30z (shown in broken outline), the bearings 30x,30z having a diameter which is slightly smaller than portions 124,126. When the apertured ball 18 is in the throughbore closed position (FIG. 2) the apertured ball 18 is free to move along the longitudinal axis 21 of the bearing mounted ball valve 10 towards the valve seat 16 because of the clearance at the increased width locations 124,126.

Ball bearing 30y is located on a plane 23 which passes through the axis of rotation 19 of the apertured ball 18 and is perpendicular to the longitudinal axis 21 of the throughbore 14. When the apertured ball 18 is in the throughbore closed position the channel 32 immediately below the ball bearing 30y is appropriately positioned to permit the apertured ball 18 to move towards the valve seat 16 without the need for the width of the channel 32 at location "128" to be increased.

The increased width at first location 124 and second location 126 is in the region of 0.6 mm (0.125 inches). A movement of the apertured ball 18 over this distance applies a sufficient load to the valve seat 16 to form a high integrity seal.

Various modifications and improvements may be made to the embodiments hereinbefore described without departing from the scope of the invention. For example, it will be understood that any suitable number of ball bearings could be used to constrain the rotation of the apertured ball to the axis of rotation. Similarly, although the support surfaces are provided on the bearing plates, they could be provided on the mandrel. In an alternative arrangement, each of the pair of bearing plates defines a channel, and the ball bearings are located in hemispherical pockets defined by the portions of the outer surface of the apertured ball which oppose the bearing plates.

Those of skill in the art will also recognise that the above described embodiment of the invention provides a bearing mounted ball valve 10 which combines highly reliable rotation with increased reliability of sealing.

The invention claimed is:

1. A bearing mounted ball valve comprising:
   a housing having a throughbore and a valve seat;
   an apertured ball mounted within the housing in continuous engagement with the valve seat, the apertured ball being rotatable by rotation means, about an axis of rotation, between a throughbore open position and a throughbore closed position, and
   bearing means coupled between the apertured ball and the housing for constraining the rotation of the apertured ball about the axis of rotation between the throughbore open and the throughbore closed position,
   wherein in the throughbore closed position, the bearing means is adapted to release the apertured ball from the axis of rotation to permit the apertured ball to float into a sealing engagement with the valve seat; and
   wherein the bearing means comprises a pair of bearing plates located on diametrically opposite sides of the throughbore, each plate having a plurality of hemispherical pockets, each pocket containing a ball bearing.

2. The bearing mounted ball valve of claim 1, wherein the apertured ball has an outer surface defining a pair of channels, each channel opposing one of the bearing plates.

3. The bearing mounted ball valve of claim 2 wherein the channels have a substantially semi-circular cross-section, the width of each channel being substantially the same as the diameter of each ball bearing.

4. The bearing mounted ball valve of claim 3, wherein the channels are arcuate channels, the arc being centred on the axis of rotation of the apertured ball.

5. The bearing mounted ball valve of claim 3, wherein at least one portion of each channel is dimensioned to permit the apertured ball to move in an axial direction towards the valve seat when the apertured ball is in the throughbore closed position.

6. The bearing mounted ball valve of claim 5, wherein the at least one portion of each channel is dimensioned by providing an increased width.

7. The bearing mounted ball valve of claim 5, wherein the axial movement of the apertured ball is approximately 0.6 mm (0.025").

8. The bearing mounted ball valve of claim 1, wherein each of the pair of bearing plates defines a channel, and the ball bearings are located in hemispherical pockets defined by the portions of the outer surface of the apertured ball which oppose the bearing plates.

9. The bearing mounted ball valve of claim 1, wherein each bearing plate comprises three hemispherical pockets and three ball bearings.

10. The bearing mounted ball valve of claim 9, wherein each bearing plate comprises three ball bearings, one of the ball bearings being located on a plane which passes through the axis of rotation of the apertured ball, the plane additionally being perpendicular to the longitudinal axis of the throughbore.

11. The bearing mounted ball valve of claim 1, wherein the housing further includes at least one support surface distal to the valve seat, the outer surface of the apertured ball having at least one complementary surface for engaging the at least one support surface.

12. The bearing mounted ball valve of claim 11, wherein there are two support surfaces on diametrically opposed sides of the housing.

13. The bearing mounted ball valve of claim 1, wherein the rotational means comprises an annular piston located within the housing and adapted to engage the apertured ball.

14. The bearing mounted ball valve of claim 13, wherein the annular piston engages the apertured ball by means of a pair of arms, the arms being pivotally mounted to the annular piston.

15. The bearing mounted ball valve of claim 13, wherein the annular piston is hydraulically actuated.

16. The bearing mounted ball valve of claim 13, wherein the annular piston is mechanically or electromechanically actuated.

17. A method of sealing a wellbore with an apertured ball valve, the method comprising:
  disposing a ball valve housing having a throughbore and a valve seat in the wellbore, the ball valve comprising a housing having a throughbore and a valve seat, an apertured ball mounted within the housing in continuous engagement with the valve seat, the apertured ball being rotatable by rotation means, about an axis of rotation, between a throughbore open position a throughbore closed position, and bearing means coupled between the apertured ball and the housing for constraining rotation of the apertured ball about the axis of rotation between the throughbore open and the throughbore closed position;
  rotating an apertured ball constrained to an axis of rotation from a throughbore open position to a throughbore closed position, the apertured ball remaining in continuous contact with the valve seat; and
  permitting the apertured bail to move axially when in throughbore closed position into a sealing engagement with the valve seat in the throughbore closed position;
  wherein the bearing means comprises a pair of bearing plates located on diametrically opposite sides of the throughbore each date having plurality of hemispherical pockets, each pocket containing a ball bearing.

\* \* \* \* \*